Aug. 16, 1966 R. W. BRYANT 3,266,253
VARIABLE SPEED HYDRAULIC TRANSMISSION
Filed Sept. 24, 1964 3 Sheets-Sheet 1
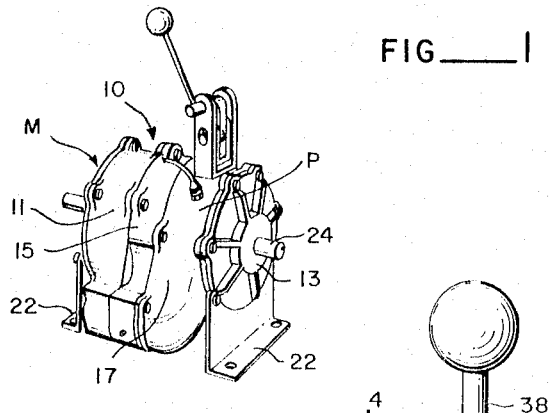
FIG—1
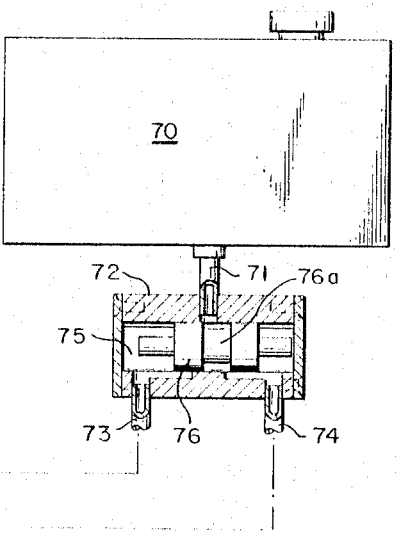
FIG—2
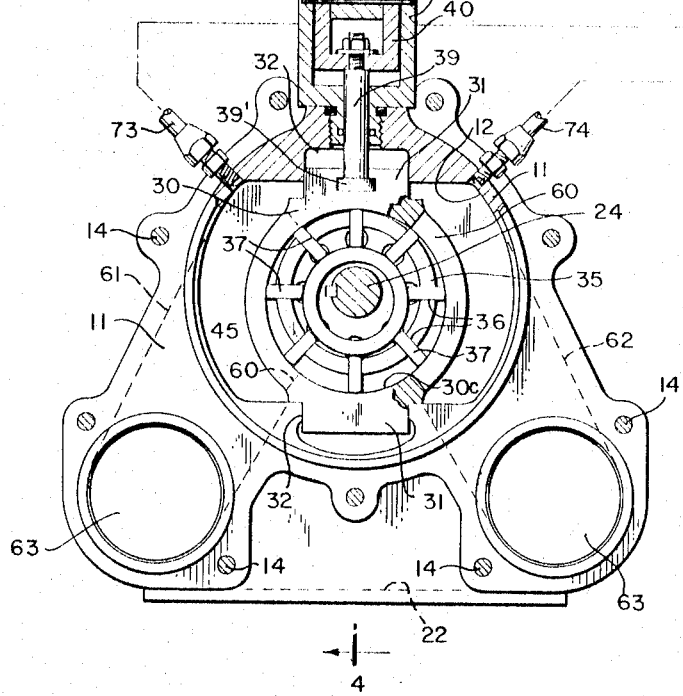
FIG—9
RAYMOND W. BRYANT
INVENTOR.
BY *Seed & Berry*
ATTORNEYS Aug. 16, 1966  R. W. BRYANT  3,266,253
VARIABLE SPEED HYDRAULIC TRANSMISSION
Filed Sept. 24, 1964  3 Sheets-Sheet 2
FIG__3
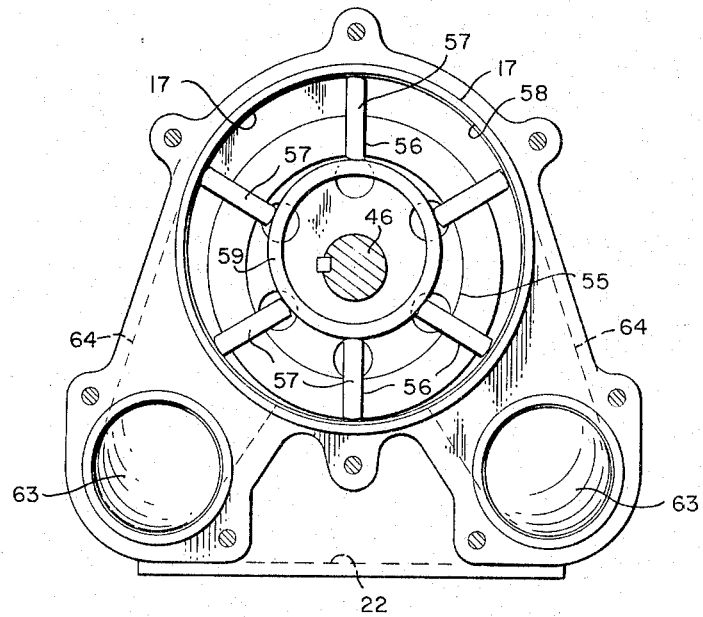
FIG__4
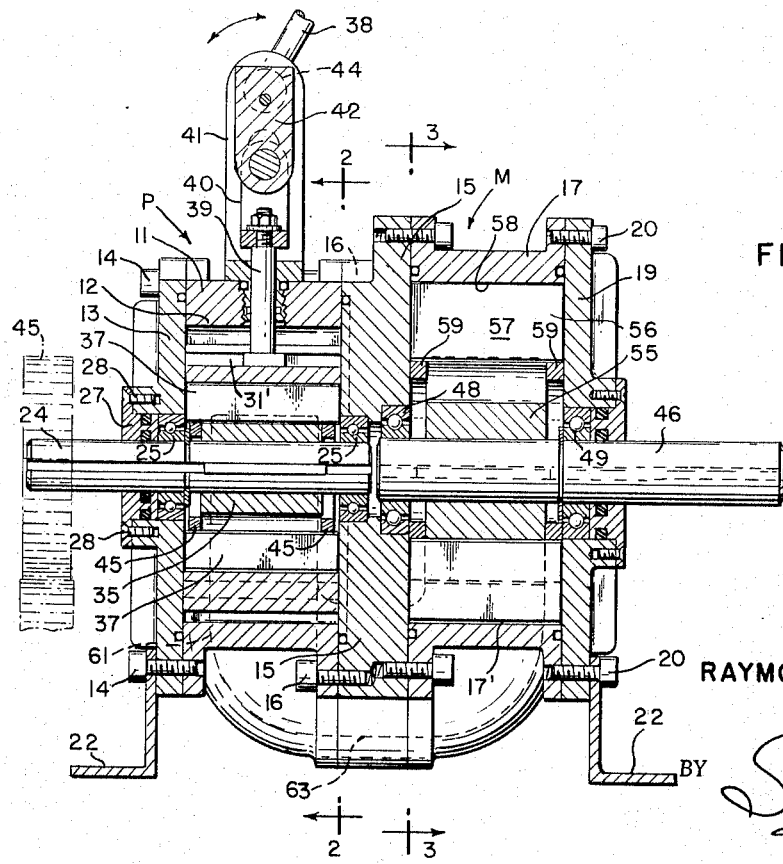
RAYMOND W. BRYANT
INVENTOR.
BY *Seals Berry*
ATTORNEYS Aug. 16, 1966 R. W. BRYANT 3,266,253
VARIABLE SPEED HYDRAULIC TRANSMISSION
Filed Sept. 24, 1964 3 Sheets-Sheet 3
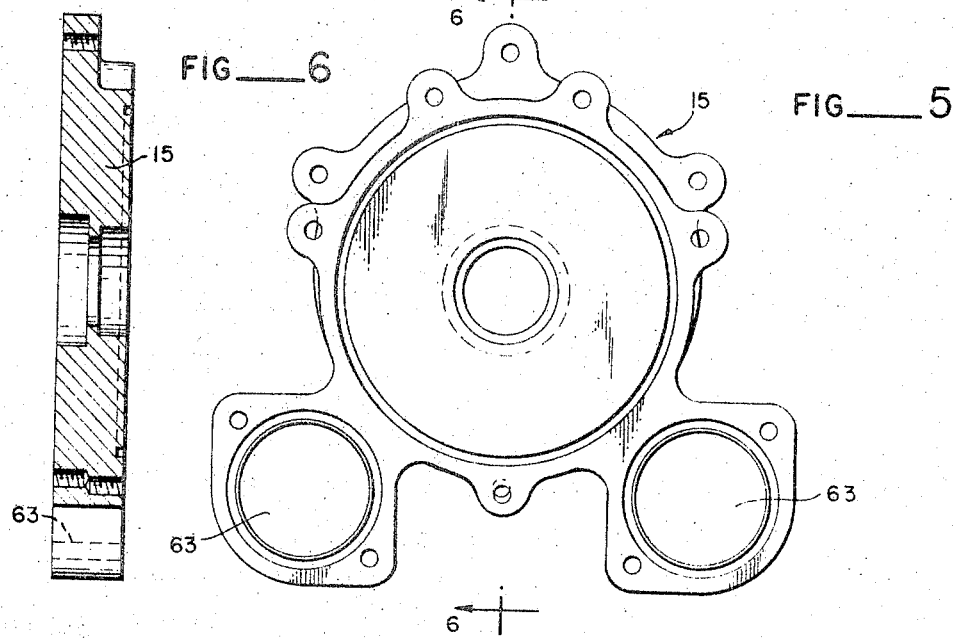
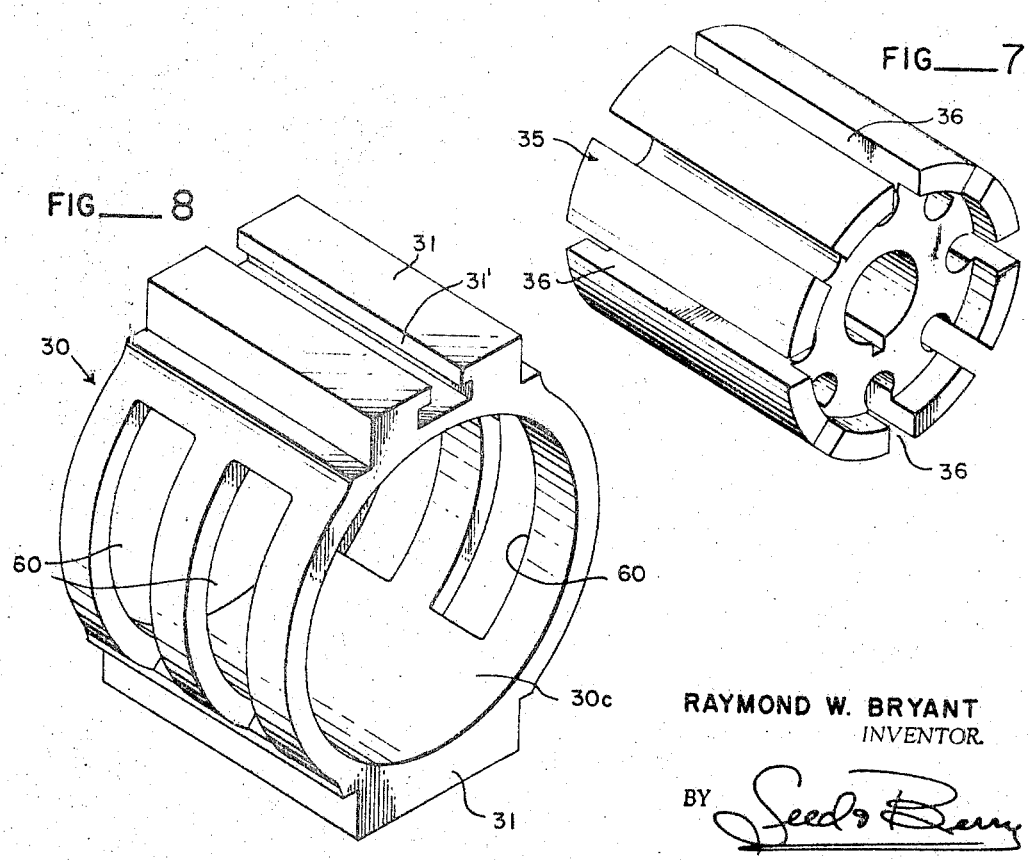
RAYMOND W. BRYANT
INVENTOR.
BY *Seeds Berry*
ATTORNEYS

United States Patent Office 3,266,253
Patented August 16, 1966

3,266,253
VARIABLE SPEED HYDRAULIC TRANSMISSION
Raymond W. Bryant, 2348 Alki Ave., Apt. 203,
Seattle, Wash.
Filed Sept. 24, 1964, Ser. No. 398,914
2 Claims. (Cl. 60—53)

This invention relates to improvements in variable speed power transmission systems suitable for the driving of trucks, tractors and the like and various other vehicles, machines or mechanisms where speed and power changes are required in their operation.

More particularly, the present invention pertains to a power transmission mechanism wherein a hydraulic pressure medium is caused to be forcibly delivered, in a closed circuit, through a fluid motor for the driving of an impeller equipped rotor from which a power transmission shaft extends for the driving of a machine or mechanism.

It is a further object of this invention to provide a transmission mechanism of the character above stated wherein the hydraulic pressure medium as used is delivered through the closed circuit by a power driven rotary pump and the flow of the medium pumped through the circuit may be varied in volume and in its direction of flow by a valve adjustment made in the pump, thus to effect the driving of the motor shaft in a desired direction and at a desired speed.

Other objects and advantages of the present invention reside in the details of construction and combination of the various parts of the mechanisms of pump and motor and in their mode of operation, as will be explained herein as this specification progresses.

In accomplishing the above mentioned and other objects of the invention, I have provided the improved details of construction, the preferred forms of which are illustrated in the accompanying drawings, wherein—

FIG. 1 is a small perspective view of a power transmission mechanism, embodying the present invention therein.

FIG. 2 is a vertical cross-section of the mechanism, taken in its axial plane, showing the pump rotor and the slidably adjustable flow control valve ring surrounding the pump rotor.

FIG. 3 is a cross-section of the mechanism taken on line 3—3 in FIG. 4, showing the vane equipped rotor of the motor unit.

FIG. 4 is a vertical section of the mechanism, taken in its vertical axial plane, as on line 4—4 in FIG. 2.

FIG. 5 is a side view of the "middle" plate of the device.

FIG. 6 is a section of the middle plate, taken on line 6—6 in FIG. 5.

FIG. 7 is an isometric view of the rotor of the pump unit.

FIG. 8 is a isometric view of the rotor ring or valve member of the pump unit.

FIG. 9 is an enlarged showing of one of the rotor vanes as applied in the motor housing.

Referring more in detail to the drawings:

The power transmission device of this invention, as shown in reduced scale in FIG. 1, is designated in its entirety by reference numeral 10. In its assembled condition, as seen in FIG. 4, it comprises what will herein be referred to as the "pump unit," which in its entirety is designated by reference character P, and the "motor unit," which is designated in its entirety by reference character M.

As seen in FIGS. 2 and 4, the pump unit P comprises the pump case 11, which is of substantially annular formation and encloses a cylindrical pump chamber 12 therein which is closed at its outer end by a cover plate 13 and is closed at its inner end by what has herein been designated as the "middle plate" 15 shown enlarged in FIGS. 5 and 6. The pump case 11 is secured at its inner end to the middle plate 15 by a plurality of screw bolts 16 that are applied through peripheral ears or flanges formed thereon and threaded into the plate.

The motor unit M as seen in FIG. 4 comprises an annular case 17 which provides a cylindrical chamber 17' therein. This case is closed at its inner end by its securement to the middle plate 15 in the same manner of securement of the pump case 12 to that plate, and at its outer end is closed by a cover plate 19 secured thereover by a plurality of screw bolts 20 applied through ears on its peripheral portion. As thus joined to opposite faces of the middle plate 15, the two cases 11 and 17 are substantially in alignment, and the mechanism may be handled as a rigid unit.

The opposite end plates 13 and 19 of the assembled mechanisms are formed across their bottom edges, as will be observed by reference to FIGS. 2 and 4, with mounting plates formed with outturned horizontal flanges 22—22 which are designed to serve as supporting feet for the unitary mechanism, and which may be bolted or otherwise anchored to a base or footing on which it may be disposed for use.

Extended through the cover plate 13 and substantially centrally into the enclosed pump chamber 12 of case 11, is the pump drive shaft 24; this shaft is rotatably mounted by anti-friction bearings 25—25 that are fitted in bearing seats provided therefor in the end plate 13 and middle plate 15. Also, the shaft 24 is fitted with a packing gland 27 which is shown to be secured in place in plate 13 by screw bolts 28.

Contained within the cylindrical chamber 12 of the annular pump case 11 is what is herein designated as the "rotor ring" or valve ring 30. It has been shown enlarged and in perspective in FIG. 8 and it has been shown in FIG. 2 that the motor drive shaft 24 extends substantially concentrically into the pump chamber 12 and centrally through the rotor ring 30 and also that the rotor ring 30 which constitutes the valve member for fluid direction and flow is formed exteriorly along the top and bottom wall portions thereof, with extended mounting guide ribs 31—31 which are vertically slidably contained in guideways 32—32 that are formed in the top and bottom wall portions of the case 11, for purposes presently to be explained.

Contained within the cylindrical chamber 30C enclosed by the motor ring 30 with clearance between them, as seen in FIG. 2, is the pump rotor 35 which is mounted coaxially on shaft 24 and is keyed thereto. This rotor is formed longitudinally thereof and at equally spaced angular intervals, circumferentially thereof, with radial slots 36 in each of which, a pump vane 37 is slidably fitted. These impeller vanes extend radially from the rotor slots into close sliding contact along their outer edges with the inside cylindrical surface of ring 30 and at their opposite end edges are in close sliding contact with the cover plate 13 and middle plate 15 as seen in FIG. 4. At opposite sides of the pump rotor 35, the rotor ring 30 is provided with fluid passages or slots 60—60, as shown best in FIG. 8. These slots are of such area as to allow unrestricted flow of the pumped liquid in either direction of flow therethrough as presently explained.

It will be understood by reference to FIG. 2 that the showing of the pump rotor 35, as mounted on drive shaft 24 and as contained in the rotor ring 30 with clearance between them, that with any vertical shifting of the rotor ring 30, this relationship will be changed accordingly. Any change thus made in position of ring 30 will vary the flow of pumped hydraulic medium and it may also be caused to reverse the direction of flow in the circuit to change the direction of driving of the motor shaft, as presently explained.

The vertical adjustment of the rotor ring 30 is herein effected manually by a handle or lever arm 38 seen in FIGS. 2 and 4 operating through a bolt connection 39 with the top guide rib 31 of the ring 30. FIG. 2 shows the bolt 39 to have a head 39' at its lower end interlocked in a slot 31' formed across the top of lug 31, see FIG. 8, and secured at its upper end in the base of a U-shaped yoke 40 that is vertically slidable in a guide frame 41 fixed to the top of the pump case 11. The yoke 40 is connected at its upper end by means of a link 42 with a pivot pin 43 that extends eccentrically from the mounting shaft 44 for lever arm 38. Thus, with the adjustment of lever 38 and its mounting shaft, the ring 30 is raised or lowered to more or less close the annular passage between the rotor and ring either at the top of the rotor or at the bottom, or to locate it at any position between its limits of vertical adjustment.

In use of the present mechanism, the pump drive shaft 24 is driven by means of a gear or belt wheel 45 applied to its outer end, to drive the rotor 35. As the rotor 35 is driven, the outer edges of the eight impeller blades 37 are maintained in sliding contact with the walls of chamber 30C by means of two rings 45—45 which are shown in FIGS. 2 and 4 to encircle the shaft 24 with clearance and to holdingly engage the inner end edges of all the vanes. The diameters of these rings is such that they serve, as the rotor 35 is driven, to maintain the outer edges of all vanes in close contact with the chamber walls regardless of any vertical adjustment of ring 30 made for the purpose of changing volume of flow of pumped hydraulic medium in the closed circuit or for change of direction of drive effected thereby.

It is also noted in FIG. 3 that the rotor case 17 is attached to the middle plate 15 slightly above and eccentrically of the axial line of shaft 24. Extended into the case 17 from its outer end coaxially of the shaft 24 is the motor drive shaft 46, which is extended inwardly through end plate 19 and has its inner end portion rotatably mounted in an anti-friction bearing 48 fitted in a seat in plate 15 and in an anti-friction bearing 49 that is mounted in the end cover plate 19; this latter bearing being held seated by a packing gland applied thereover about shaft 46 and fixed to plate 19, as shown in FIG. 4.

Mounted on shaft 46 and keyed thereto is a rotor 55 of cylindrical formation that is longitudinally radially slotted as at 56 for mounting therein of six equally spaced impeller blades or vanes 57 in the same manner as the vanes 37 are mounted in the pump rotor 35, for rotation of the rotor 55 in the cylindrical chamber 58 formed by the motor case 17; this chamber 58 being slightly eccentric of the rotor and its shaft 46 by reason of mounting the chamber with its axial line slightly above the axial line of the shaft 46. Also, in the motor unit, the blades 57 are retained in sliding contact with the surrounding wall of the chamber 58 by a pair of rings 59—59 as in FIG. 3, but are allowed to move inwardly and outwardly in the radial containing slots 56 to maintain their sliding contact at their outer longitudinal edges with the cylindrical outside wall of chamber 58.

It is a feature of the pump unit P that the normal eccentric relationship of the pump rotor 35 as disposed in the pump chamber 12 provides a fluid chamber between them that, when closed at either the top or bottom, of the case 12, will be opened to its maximum extent at the opposite side. Then, by shifting the rotor ring 30 vertically this relationship can be varied and ultimately reversed, thus to control volume and directional flow of the pressure medium. When the ring chamber 30C is centered relative to the pump rotor, the flow of fluid pressure medium is neutralized with no impelling effect on the motor rotor 55.

The fluid passages 60—60 as provided in opposite side walls of the rotor ring communicate respectively with fluid passages 61 and 62, as seen in FIG. 2, that are directed downwardly to open at their lower ends into horizontal passages 63—63 directed through the lower ends of opposite side portion of center plate 15, as shown in FIG. 5, then into passages 64—64 in the opposite side portions of the motor case 17, which latter passages have direct communication with the motor case chamber 58, at opposite sides of the motor rotor 55 as seen in FIG. 3.

It has been shown in FIG. 9 that the rotor vanes 57, as applied to the slots 36 of the rotor 35 are arcuately rounded at their top and bottom edges about central axial lines of the vanes. This rounding is for the purpose of insuring that any lateral tilting of the vanes in operation that may result from wear or loosening that may occur after a period of continued use, will not cause the blades to bind or tighten against the casing walls.

The blades 37 or vanes of the rotor 35 are likewise rounded across the longitudinal edges.

Assuming that the mechanism is so constructed and that the fluid circuit provided by the pump case and rotor case is filled with the fluid pressure medium, it is apparent that the driving of the pump rotor 35 by means of shaft 24 in the direction indicated by the arrow thereon in FIG. 2 will cause the liquid medium to be sucked into the ring chamber 30C through the slots 60 at the left hand side of the rotor 35 and forcibly expelled through the discharge slots 60 at the opposite side, to flow through the connecting passage 62 and plate passage 63 and be forcibly delivered into the motor chamber 58 at the corresponding side of the rotor 55 to act on the impeller vanes 57 to drive the rotor 55 and its shaft 46. This liquid medium will be delivered by the rotor 55 to the opposite side of the case 17 and there discharged into the discharge passage 64 at that side and returned to the pump chamber for continued flow in the continuous circuit.

The hydraulic pressure meduim of the system is automatically maintained by means shown in FIG. 2 wherein 70 designates a tank or container for a supply of the hydraulic medium employed. This tank has a bottom wall pipe connection 71 opening centrally into a horizontally disposed valve cylinder 72 with pipe connections 73 and 74 leading from opposite ends of the valve chamber 75 to opposite sides of the pump chamber 12. Slidably fitted in the valve chamber 75 is a valve member 76 which is shiftable in opposite directions under differential of the pressure medium in the pressure side and suction sides of the pump chamber.

If, for example, the pump rotor as seen in FIG. 2 is driven in a clockwise direction, pressure of the fluid medium at the left hand side of the pump chamber will be transmitted through pipe line 73 to the left end of cylinder 72 and act to shift the valve member 76 to the right and in so doing will cause a passage 76a of the valve member to allow flow from supply tank 70 to pipe 74 to supply any deficiency that may occur in the suction side of the pump. If the direction of the rotor is reversed, the valve member shifts, under force of pressure medium in the pressure side of the pump, to allow the supplying of any deficiency of medium in the suction side of the pump. Thus, the circuit is automatically retained filled with the pressure medium.

In the claims that terminate this specification, the terms "impeller type rotary pump" and "impeller type rotary motor" are intended to designate these elements, as illustrated and described, or in other similar types so long as the mode of operation and results attained thereby in a similar combination are comparable. Both in the pump and motor the rotors are longitudinally slotted to contain the impeller blades therein with the end and outer edges in close pressure sealed sliding contact with the cylindrical chambers in which they are contained.

What I claim as new is:

1. A unitary power transmission mechanism comprising in combination, a pump unit and a motor unit; said pump unit comprising a case defining a pump chamber and said motor unit comprising a case enclosing a cylindrical motor chamber; said cases being joined substantially in coaxial adjacency to and separated by a middle plate; an impeller equipped driven pump motor mounted in the pump chamber; an impeller equipped rotor mounted in the motor chamber; a cylindrical valve ring provided with guiding lugs at the top and bottom thereof slidably fitted in guideways in the pump chamber, said valve ring being fitted about the pump rotor as a dam across the pressure medium circuit and formed in its opposite side walls with fluid passages through which the fluid pressure medium of the circuit will be pumped by driving of the pump rotor and forcibly circulated in the circuit for driving the motor rotor; means for shifting the valve ring in the pump case relative to the pump rotor to establish the volume and direction of flow of the pressure medium delivered to the motor by the pump for driving it comprising an adjusting linkage attached to the valve ring and connected with an adjusting member disposed exteriorly of the pump case operable for controlling direction and volume of flow of the pressure medium in the circuit with shifting of the valve ring relative to the pump rotor, such adjusting member comprising a guide frame fixed to the pump case, a U-shaped yoke longitudinally slidable in said guide frame and connected at its base to said adjusting linkage, a lever arm eccentrically hinged to an opposite end of the yoke and adapted to pivot about the hinge point to longitudinally slide said yoke radially toward and away from said pump case such that said valve ring is radially movable within said pump chamber; and fluid medium supply means exterior to the pump and motor unit comprising a storage tank for the pressure medium, a valve interconnecting said storage tank and opposite sides of said pump chamber, and a valve member slidably fitted in said valve and adapted to shift position in response to differential pressure changes at the opposite sides of said pump chamber such that pressure fluid from said storage tank is directed only to the side of the pump chamber constituting the suction side.

2. A power transmission mechanism according to claim 1 wherein the pump rotor is formed lengthwise with radial slots containing impeller vanes radially movable therein and maintained in sliding contact with the cylindrical chamber of the valve ring to opposite sides of a neutral setting to change the direction of flow of fluid medium in the circuit and the volume of flow accordingly, said impeller vanes having top and bottom edges arcuately rounded about the respective central axial lines of the vanes such that the radial length of such vanes is constant regardless of any lateral tilting thereof in said radial slots.

References Cited by the Examiner

UNITED STATES PATENTS

| | | | |
|---|---|---|---|
| 2,298,393 | 10/1942 | Lindner | 60—52 |
| 2,304,620 | 12/1942 | Shaw | 60—52 |
| 2,359,423 | 10/1944 | Johnson | 60—53 |
| 2,447,348 | 8/1948 | Kucher | 60—53 |
| 2,680,348 | 6/1954 | Wahlmark | 60—53 |

FOREIGN PATENTS 726,934    3/1932   France.

EDGAR W. GEOGHEGAN, *Primary Examiner.*